Patented Oct. 10, 1933

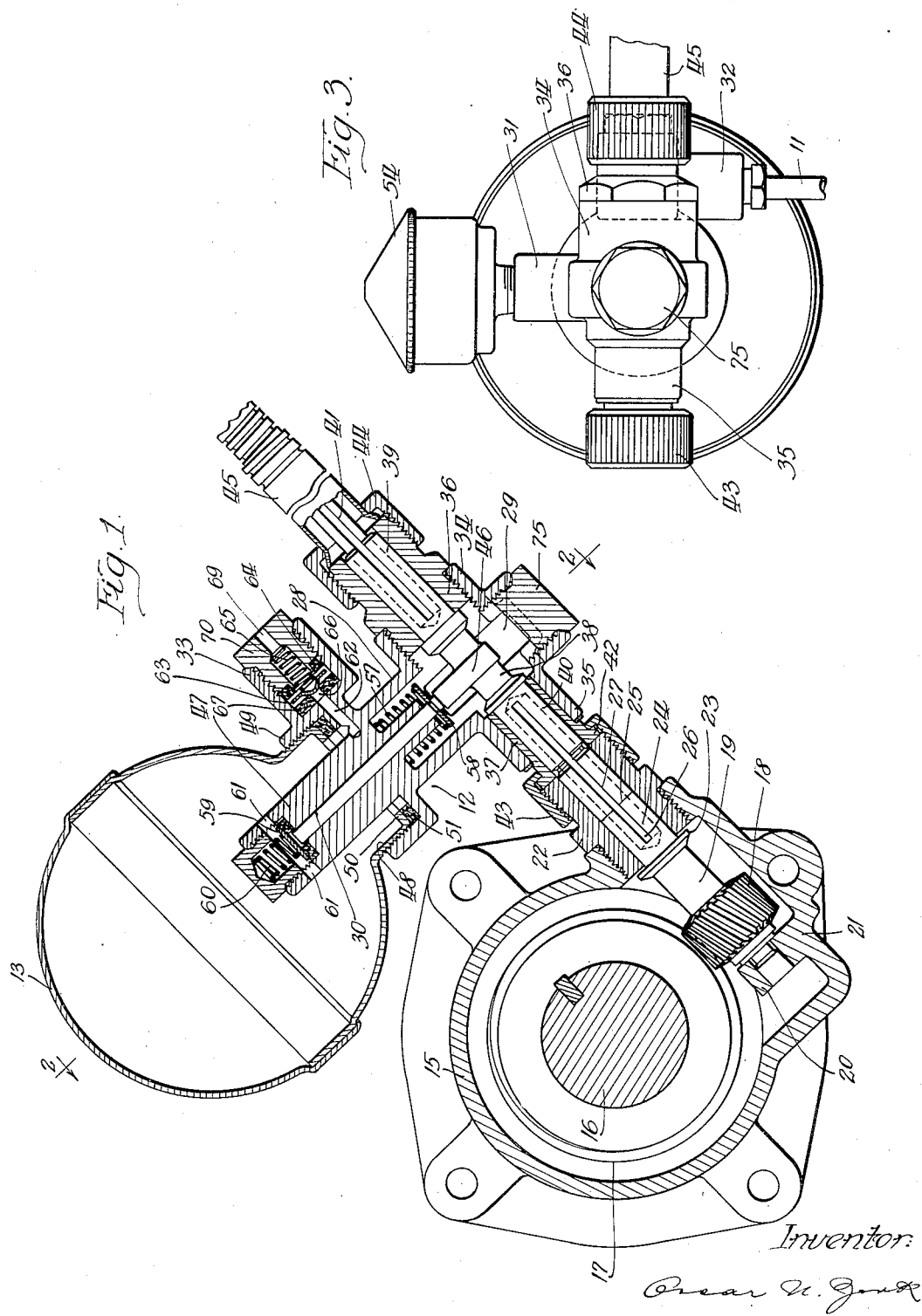

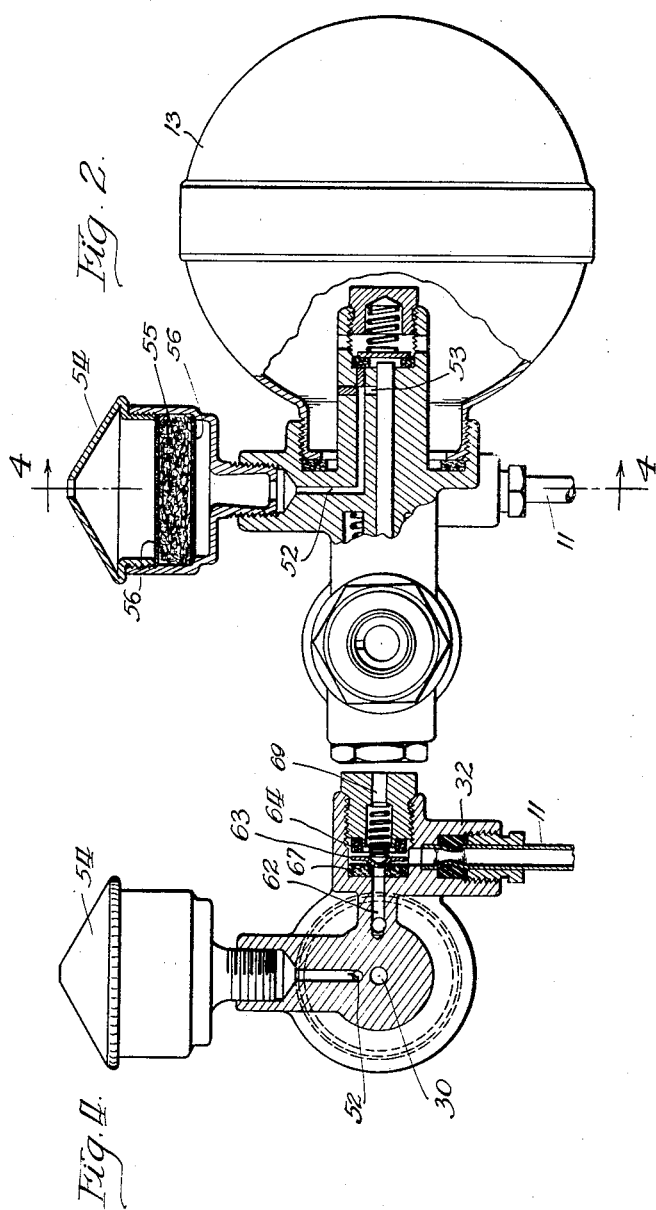

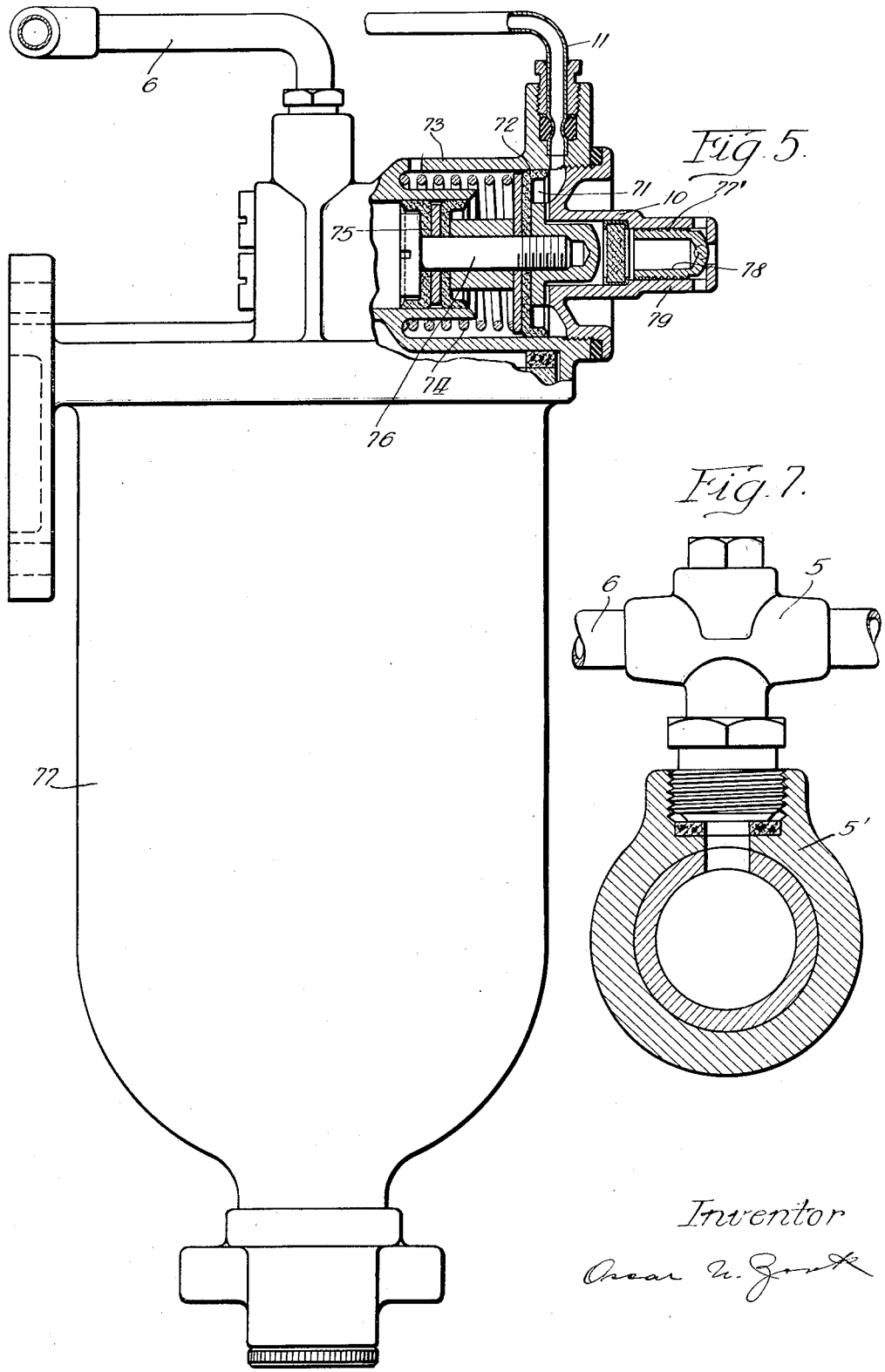

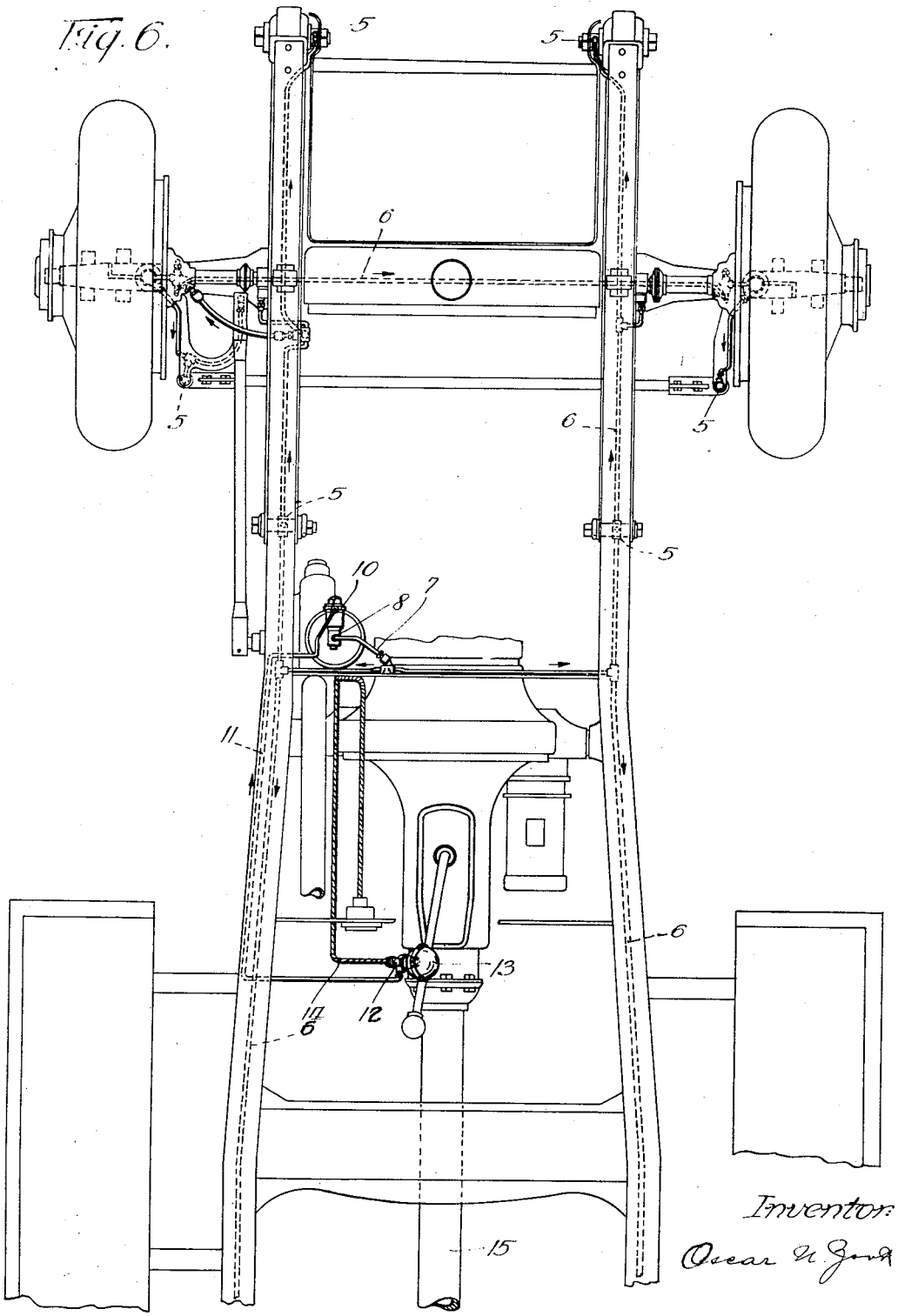

1,929,764

UNITED STATES PATENT OFFICE 1,929,764

LUBRICATING MEANS

Oscar U. Zerk, Chicago, Ill., assignor to Alemite Corporation, Chicago, Ill., a corporation of Delaware Application November 9, 1929. Serial No. 406,107

9 Claims. (Cl. 184—7)

My invention relates to lubrication, and more particularly relates to lubrication of a plurality of bearings from a central common source, known as centralized lubrication, being particularly applicable to the lubrication of the chassis of vehicles, such as automobiles, tractors, gun carriages, war tanks, locomotives, aeroplanes, airships, sea vessels, and the like.

This invention relates more particularly to the provision of motive power for actuating a pump element adapted for use in an automatic centralized lubricating system.

In automatic lubrication of the many bearings of an automobile chassis from a common source, power for effecting the lubrication may be derived from at least five different sources:—

First, from movements of parts of the car resulting from road shocks when traveling over a road whose surface is not smooth;

Second, from pulsations of pressure exerted by gases exhausted from the engine, or by air admitted to the engine;

Third, from movements of liquids, such as the movements effected by the engine oil pump, or of water effected by the water pump of the engine cooling system;

Fourth, from electrical impulses;

Fifth, from the running parts of the vehicle.

My invention relates to the last of the above mentioned sources of power supply.

Certain of the parts of an automobile engine operate at a very high rate of speed; for instance, the engine crankshaft is commonly rotated up to about 3,000 revolutions per minute, while the cam shaft rotates up to about 6,000 revolutions per minute.

If lubricant pumping impulses were derived at the rate of one per sixty miles of travel, from the crank shaft, while turning at a speed of 3,000 revolutions per minute, or 180,000 revolutions per hour, a speed reduction ratio of 180,000 to 1 would be required, and if derived from the cam shaft turning at a speed of 6,000 revolutions per minute, or 360,000 revolutions per hour, a speed reduction of 360,000 to 1 would be required.

To accomplish such a great ratio of speed reduction between a crank shaft or cam shaft and the operating element of a lubricant pump, and to dispense, at one time, enough lubricant to lubricate all the chassis bearings of an automobile, would necessarily involve a very complicated and very costly speed reduction gear mechanism.

In my copending application, Serial No. 394,363, filed September 21, 1929, and Serial No. 397,337, filed October 4, 1929, I have very completely disclosed complete lubricating systems of the automatically operable centralized lubrication type, to which my present invention has a particular application, and in my said applications the use of an air pump, disclosed therein, employing a piston of relatively small diameter for supplying an actuating flow of a fluid, such as air, under pressure, to noiselessly actuate a lubricant pumping mechanism for the lubrication system is described in detail.

Reference, therefore, may be had to said copending applications, for the detailed description contained therein, of mechanisms similar to some of those employed herein.

The use of a small diameter air piston and a relatively large air pressure or vacuum reservoir has the great advantage of achieving an extraordinary reduction in speed with a minimum of cost and expense, and in a very noiseless manner; the present application relates more particularly to the power take-off mechanism for the air pump, above referred to.

The use of an air pump with small diameter piston and a relatively large air pressure or vacuum reservoir has the additional advantage that immaterial of how much air may be pumped into or drawn from the air pressure reservoir, which pressure or vacuum is released once every sixty miles to apply pressure on the lubricant piston of the lubricant pump, that this compressed air or vacuum is only used in an indirect way and not in a direct way for lubrication purposes.

That is to say, if we would use oil in place of air, an immense amount of lubricant would be forced into the bearings while with the use of air, irrespective of the speed of the air pump, and irrespective of the amount of air pressed or drawn out with the air pump, only a predetermined amount of lubricant is forced into the bearings during the predetermined amount of road travel.

Since an air pump with a piston of small diameter and without costly miniature piston rings or packing means must run at relatively high speed in order to prevent by-passing of air around the piston, which speed is approximately between 500 to 1,000 revolutions per minute, a relatively low reduction of speed between the crank shaft or cam shaft or the propeller shaft and the air pump drive shaft will be required. The reduction in speed required in such a case will then range from 1 to 1 to 12 to 1.

The speed reduction ratio is very low in comparison with the reduction of 180,000 to 1 and 300,000 to 1 described before. It must be remembered that it is rather difficult to find a place in the engine mechanism of an automobile where such power reducing mechanism can cheaply be installed. Such an installation would result in the change of design in jigs, tools and equipment for manufacturing an automobile engine, which is very undesirable.

For this reason I have decided to take the power supply for an improved lubricating system of the above character from the speedometer drive with which automotive vehicles are commonly provided, wherein the driving shaft is so designed as to revolve at a rate of 1,000 revolutions per mile at any car speed.

Since according to my invention I preferably lubricate the chassis of an automobile by the mile, one "shot" about every sixty miles, and since my air pump piston should, preferably, run at a speed of 1,000 revolutions per mile, which would be 1,000 revolutions per minute when the car is going at sixty miles an hour, 500 revolutions per minute when the car is going at thirty miles an hour, and 250 revolutions per minute when the car is going at fifteen miles per hour, to prevent by-passing of air, the use of the speedometer shaft drive would, therefore, need no further speed reduction mechanism and can be used as is.

When power is tapped from a speedometer drive mechanism, it is highly desirable not to add any additional strain to the speedometer cable or the speedometer mechanism because the speedometer cable and mechanism are ordinarily designed for no other purpose than to drive the speedometer, which needs an exceedingly small amount of power.

I, therefore, tap my power for driving my pump from a point between the speedometer cable connection and the worm drive of the propeller shaft, or from any other shaft from which the speedometer cable takes its source of driving power. This driving mechanism can, of course, be equally well used for the opposite type of an air pump, that is a vacuum pump.

My present application is companion to my copending application, Serial No. 406,108, filed coincidentally herewith, wherein a power take-off mechanism for an automatic centralized lubricating system of an automotive vehicle, is interposed between the driving worm gear carried by the propeller shaft and the more frangible universally flexible speedometer shaft.

An object, therefore, of my present invention is to provide a power take-off for a centralized lubricating system operable from an element of the mechanism for operating the speedometer of an automobile.

Another object of my invention is to provide an improved power take-off of a speedometer mechanism for a lubricating system in an improved manner whereby the speedometer mechanism, and a flexible shaft for operating it, is not required to be operated under increased load conditions over that for which they were originally designed.

Another object of my invention is to provide an improved power take-off for a speedometer shaft drive mechanism operable to actuate an air pump, which in turn accumulatively effects periodic operations of a lubricant pump of a centralized lubricating system.

Another object of my invention is to provide a power take-off for a speedometer drive mechanism, which is adapted to be installed in operative relation thereto, without first requring alteration of the standard fittings of such mechanism.

Another object of my invention is to provide a substantially noiseless power take-off for periodically operating the lubricant pumping mechanisms of an automatically operable centralized lubricating system for an automobile, from a rotatable part of the automobile.

Another object of my invention is to provide an improved lubricating system for periodically communicating lubricant to the chassis bearings of an automobile proportional to the mileage travel of the automobile.

Another object of my invention is to provide an improved automatically operable centralized lubricating system wherein efficient periodic lubrication of the bearings of an automotive vehicle on which the system is installed, is obtained proportional to the mileage travel of the vehicle.

Another object of my invention is to provide an improved automatically operable centralized lubricating system wherein efficient periodic lubrication of the bearings of an automotive vehicle proportional to the mileage travel of the vehicle, is obtained without requiring the use of noisy, complicated, or expensive gearing.

Other objects of my invention and the invention itself will be apparent to those skilled in the art to which my invention appertains, by reference to the following description of an embodiment of my invention, wherein reference is had to the accompanying drawings illustrating the said embodiment.

In the drawings:

Fig. 1 is a sectional view taken transversely of the automobile propeller shaft of apparatus embodying my invention, which is shown in longitudinal medial sectional view;

Fig. 2 is a view, largely in medial section on the line 2—2 of Fig. 1, parts, however, being shown in elevation and the reservoir element broken away to conserve drawing space;

Fig. 3 is a view of the power take-off mechanism of the foregoing figures, in plan, from the side of the mechanism opposite the air reservoir thereof;

Fig. 4 is a sectional view taken on the line 4—4 of Fig. 2;

Fig. 5 is a view mostly in longitudinal medial section of lubricant pumping mechanism associated with lubricant reservoir means shown in elevation, preferably associated with and periodically actuatable, responsive to the accumulative operation of the power take-off mechanism of the foregoing figures; and Fig. 6 is a diagrammatic view of a lubricating system embodying my invention, applied to the chassis of an automobile; and Fig. 7 is a side elevational view of a dispensing fitting affixed to an element of bearing, shown in transverse sectional view, of which fittings a plurality are disposed on the automobile chassis bearings.

The lubricating system illustrated in the drawings as operatively associated with the improved power take-off mechanism of my present invention, is completely described in detail, in my above said copending applications for patent, and so will be generally referred to herein, reference being had to the disclosures of the said applications for a more particular description and a more specific illustration of the associated parts of said system.

Generally, however, the lubricating system is provided with a plurality of lubricating fittings, some of which are shown at 5, Fig. 6. A conduit system 6, which receives lubricant from a discharge duct 7 leading from a lubricant pump, shown generally at 8, Fig. 6, conveys lubricant from the pump to the different fittings 5.

An actuating element generally shown at 10, Fig. 6 periodically operates the pump 8, say once for every 60 miles travel by the automobile, by the effects of fluid pressure communicated by a conduit, leading from an actuating pump 12. The pump 12 and a reservoir 13 are illustrated in Fig. 6 intermediate the driven end of a flexible speedometer driving shaft disposed within a tubular conduit 14 and a propeller shaft, not shown in the figure but disposed within the tubular housing 15, shown therein.

Figs. 1 to 4, inclusive, illustrate, specifically, the operative elements of the propeller shaft for the automobile, the power take-off mechanism, an air pump associated therewith and operable thereby, together with the attached fluid reservoir, valves, and the like associated therewith.

Referring now to Figs. 1 to 4, inclusive, in all of which like parts are designated by like reference characters, the propeller shaft 16, which is in constant driving relation to the tractive wheels of the vehicle, supports a worm gear 17 with which is constantly meshed, a pinion 18.

The pinion 18 is secured onto a shaft 19 journaled at its ends in a lug 20 of the housing extension 21 and a flanged tubular fitting 22 screw threaded by an end into a lateral wall of the said casing extension. The shaft 19 is provided with an annular thrust element 23 and is provided with a longitudinal recess 24 which extends into its end 25.

The lateral walls of which recess are longitudinally grooved to receive longitudinally extending splined projections 26 of a relatively short splined shaft section 27, a reduced end of which is projected into said recess.

A pump casing 28 provides a cam shaft casing portion 29, a cylinder for an elongated piston 30, a support for the reservoir 13, fluid communicating lugs 31, 32 and 33 and aligned tubular lugs 34 and 35 adapted to support flanged tubular bearing elements 36 and 37, respectively, for the cam shaft 38 disposed within the portion 29 and projecting therefrom by aligned shaft ends 39 and 40, respectively, disposed in said bearing elements 36 and 37.

The cam shaft ends 39 and 40 are each axially recessed with longitudinal grooves extending along the inner walls of the recesses to receive splined ends of the shaft section 27, and of the flexible speedometer shaft 41.

The short shaft section 27 has an intermediate enlarged portion making bearing contact with the bore of the tubular fitting 22. The bearing element 37 terminates exteriorly of the tubular lug 35 in a radial flange 42 which is rigidly clamped against an end of the fitting 22 by a clamping cap nut 43 having a centrally perforated end wall engageable with said flange when the nut is screw threaded by its tubular portion onto the exteriorly threaded end of the fitting 22. A similar clamping nut 44 secures the tubular flexible conduit 45 for the speedometer shaft 41, to the end wall of the tubular bearing element 36, a flaring terminal end of the tube 45 being clamped between a centrally perforated end wall of the nut and the end of the element 36.

The cam shaft 38 is provided with an intermediate, preferably integral, cam 46 and engages by its peripheral surface with the end of the slender piston 30 which is journaled axially of the casing portion 28, which also supports the reservoir 13. A projection 47 of the casing portion 28 comprising a cylinder for the piston 30 extends into the reservoir 13.

The reservoir 13 comprises two equatorially joined generally hemispherical halves, one of which, however, having the integral tubular axial projection 48 screw threaded into a tubular flange 49 of the casing portion 28 with its inturned flange 50 making compressive engagement with the annular gasket 51 interposed between said flange and an annular shoulder of the casing. An air inlet passage 52 is provided in the casing communicating at 53 with the bore of the cylinder 47 and at its outer end communicates with atmosphere through the apertured fitting 54, in the tubular walls of which there is interposed a felt, or like packing 55 faced with screens 56 on its two sides, to prevent dust and dirt being drawn through the fitting 54.

When the cam 46 is rotated by motion communicated by its shaft 38, from the propeller shaft worm gear 17, pinion 18, and shaft section 27, the speedometer shaft 41 is rotated synchronously with the pinion shaft 19 and at the same time the cam, by engagement with the piston 30, reciprocates it at the rate of, say, 1,000 actuations per mile travel of the vehicle, the piston 30 being retracted after each actuation by power of the helical spring 57 interposed between a washer 58 carried by the piston and a shoulder of the cylinder casing portion 47.

At each retraction of the piston, the valve 59 is seated to close the end passage from the cylinder and at each actuation of the piston, the valve is moved from its seat against the power of the valve spring 60 to communicate air through the lateral passages 61 to the interior of the reservoir 13. Retractive movements of the piston 30 permit air to be drawn into the cylinder, from the passage 52 and when the piston is subsequently advanced closing the passage opening through the lateral wall of the cylinder, the trapped air is compressed to again effect opening of the valve 59.

In this manner, very small amounts of air are successively compressed and expressed into the reservoir and after each expression of air into the reservoir, the valve 59 is reseated by pressure of the spring 60 to prevent loss of air from the reservoir.

A discharge passage 62 leads from the reservoir 13 to communicate compressed air therefrom periodically under the control of a differential valve 63, through the conduit 11 leading to the actuating element shown generally at 10, Figs. 5 and 6, and which will be later more fully described herein.

The differential valve mechanism comprises a pair of anular valve seat elements 64 and 67 longitudinally spaced, having central openings therethrough, and the valve element 63 adapted to seat alternatively against either of the two annular valve elements. The differential valve 63 is normally spring pressed by a helical spring 65 to seat by a centrally deflected portion of small area against the edge of the small opening 66 through the annular element 67, to restrain escape of compressed air contained within the reservoir 13 through the discharge passage 62 terminating in the small opening 66 of said annular element.

Since but a small surface area of the valve element 63 is exposed to pressure of the compressed air in the reservoir 13, the spring 65 will retain said element on its seat to prevent air passing the valve, until the gradually accumulated air pressure in the reservoir attains a sufficient value that the power of the spring 65 is no longer sufficient to retain the valve on its seat, whereupon the valve 63 will be pressed therefrom, and the air under pressure passing through the opening 66 will engage the entire face of the valve 63 to violently force it against its alternate seat 64 to prevent loss of air through the bore 69 of the plug 70 which also supports the spring 65.

Coincidental with the blowing open of the valve 63 air is forced past said valve laterally from the valve chamber intermediate the valve seat elements 64 and 67 through the bore of the lug 32, and the conduit 11 to the space 71 at one side of the motor piston 72 of the actuating mechanism, specifically illustrated in Fig. 5.

The air pressure exerted against a face of the piston 72, will move it longitudinally in the cylinder 73 against the power of the retractile spring 74 and the movement of said piston will be accompanied by a lubricant pumping movement of a second piston 75, preferably of reduced diameter, which is rigidly supported at the opposite end of the piston rod elements 76 for the piston 72 and interposed between both said pistons.

Lubricant such as grease drawn from the reservoir 77 will be pumped to the lubricating fittings, such as shown at 5 in Figs. 6 and 7, through the conduit element 6, all as more fully and completely described in detail in my said copending applications.

Compressed air contained in the space 71, as described, will slowly escape through the helical passage 77' leading from said space to atmosphere.

The helical passage 77' is provided by a very shallow fine groove cut in the surface of a tubular element 78, insertable as a plug within a bore of the tubular casing projection 79 communicating with the space 71, and the flow of air through said helical passage is so restricted that pressure in the space 71 will be reduced by loss of air, progressively, but so slowly as not to prevent a proper actuation of the motor piston 72 to perform its lubricating stroke.

Eventually, however, the air pressure in the space 71, the conduit 11, and the exhaust passages of the mechanism shown generally at 12 leading to the reservoir 13, and in the reservoir 13, will be so reduced as to approach atmospheric pressure, whereupon the motor piston 72 will be retracted by its spring 74, the differential valve element 63 will be retracted by its spring 65, and the system being restored to normal the continued reciprocation of the piston 30 will initiate a renewed accumulation of air under pressure in the reservoir 13, whereupon the above operation will be repeated periodically once for about every sixty miles travel of the vehicle.

Referring now more particularly to Figs. 1 to 4 inclusive, it should be perhaps explained, that of the apparatus shown the parts indicated by reference numerals 15 to 26, inclusive, comprise the driving elements for the insertable unit connected thereto, and in the ordinary use of these parts they are directly associated with the parts indicated by reference characters 41, 45, 44, which are, respectively, the splined end of the speedometer shaft, the flared end of the speedometer shaft conduit, and the clamping nut.

These parts, illustrated as being secured by the nut 44 to the threaded end of the fitting 36, ordinarily are joined onto the threaded end of the fitting 22.

To install my power take-off in the prior system, organized as above stated, I merely unscrew the clamping cap 44 from the exterior threaded end of the fitting 22, and replace it by the similar cap 43 to clamp the flange 42 onto said fitting edge, and at the other end of the insertable unit the cap 44 clamps the flared end of the element 45 onto the threaded end of the fitting 36.

No other changes are necessary and the insertion of the power take-off in no way interferes with the normal operation of the speedometer shaft by the driving elements actuated by the propeller shaft 16 of the automobile, nor adds to the load to be operated by the speedometer shaft. The additional function which is performed when the apparatus of my invention is installed, by the elements 15 to 26, inclusive, is to reciprocate the piston 30 and the additional slight load on said elements is substantially continuous and is easily borne by said elements, which are of sturdy construction.

Although I have described the piston 30 as effecting compression of air to actuate the motor piston 72. I contemplate employing said piston, or an element functionally corresponding thereto, to exhaust air from such a reservoir as that at 13, and to rearrange the valves and passages leading therefrom to the motor piston, in a manner well known, to periodically actuate the motor piston by virtue of the accumulative reduction in pressure of air in the reservoir 13 below that of atmosphere; in short, to provide what is known as a vacuum actuating system.

A closure cap 75 for the cam shaft casing 29 permits ready access to the interior of said casing for supplying the same with lubricant.

Having thus described my invention I am aware that numerous and extensive departures may be made from the embodiment of my invention herein illustrated and described, but without departing from the spirit of my invention.

I claim:

1. In a power take-off, in combination with a speedometer, and a drive therefor and a centralized lubricating system, a lubricant pump therefor, motor means for actuating said pump, power means for supplying force for operating said motor means, reciprocating means for accumulatively charging said power means, and means for operating said reciprocating means comprising a cam shaft, a casing, said shaft journaled at its ends in the casing, said cam shaft casing, reciprocating means and power means insertable as a unit in said automobile speedometer drive, said cam shaft being rotatable thereby and transmitting rotary movement therefrom to said speedometer.

2. In a power take-off, in combination with a speedometer and a drive therefor of a centralized lubricating system, a lubricant pump therefor, reciprocating motor means for periodically supplying force to operate said pump, means for operating said reciprocating means comprising a cam shaft, a casing, said shaft journaled at its ends in the casing, said cam shaft casing, reciprocating means and power means insertable as a unit in said automobile speedometer drive, said cam shaft being rotatable thereby and transmitting rotary movement therefrom to said speedometer.

3. In mechanism for operating a centralized lubricating system, in combination with the running gear of an automobile, a speedometer and a speedometer drive shaft, a driving element adapted to make detachable driving connection with said shaft, rotated by an element of said running gear, a lubricant pump, reciprocating motor means for supplying force to periodically operate said pump, and means for operating said reciprocating means comprising a cam shaft, a casing, said shaft journaled in the casing, said casing, reciprocating means and cam shaft insertable as a unit intermediate said driving element and said speedometer drive shaft.

4. In mechanism for operating a centralized lubricating system, in combination with the running gear of an automobile, a speedometer and a speedometer shaft, a driving element operable by said running gear, said shaft adapted for detachable driving connection with said element, a pump, an actuating element for supplying pressure to operate said pump adapted for detachable connecting interposition between said shaft and said element.

5. In mechanism for operating a centralized lubricating system, in combination with the running gear of an automobile, a speedometer and a speedometer shaft, a driving element operable by said running gear, said shaft adapted for detachable driving connection with said element, an actuating element for said lubricating system adapted for detachable connecting interposition between said shaft and said element, said actuating element comprising an operating shaft, a slender piston operable thereby, an air reservoir adapted to receive air compressed in impulses by the piston, and a motor piston adapted to receive air periodically from said reservoir, means periodically operable to communicate air from the reservoir to said motor piston, and a lubricant pump operable by said motor piston.

6. In a mechanism for operating a centralized lubricating system, in combination with the running gear of an automobile, a speedometer and a speedometer shaft, a driving element operable by said running gear, said shaft adapted for detachable driving connection with said element, an actuating element for said lubricating system adapted for detachable connecting interposition between said shaft and said element, said actuating element comprising an air pump and a reservoir cooperating therewith, a lubricant pump for the system, a motor element therefor, means adapted to periodically effect communication between said reservoir and said motor element to cause it to operate said pump.

7. In an automatic centralized lubricating system for a vehicle, in combination with the running gear thereof, a final drive shaft for said running gear, a gear on said shaft, a speedometer, a universally flexible driving shaft therefor terminating at its end, remote from the speedometer, in a plug of non-circular outline, a casing surrounding said shaft supported gear, a pinion in the casing driven by the gear, a shaft supporting the pinion journaled in the casing, an element of said supporting shaft having a plug receiving recess, a second casing adapted to be detachably supported on the first said casing, a pump mechanism comprising a driving element in said second casing, lubricating means for the chassis bearings of the vehicle operable by said driving element, said driving element terminating at an end in a plug receiving recess, a plug for association with the other end of the driving element adapted for insertion in said first recess, both of said plugs being substantially alike, either of said recesses adapted to interchangeably receive the first mentioned plug.

8. In a centralized lubricating system, the combination of a speedometer shaft, a lubricant pump, actuating means therefor comprising a fluid pressure motor and an air pump, a shaft for the air pump, said air pump shaft driven by the speedometer shaft, a dispensing conduit leading from said lubricant pump, dispensing outlets for said conduit disposed at intervals thereof, and a flow controlling means for each said outlet.

9. In a lubricating mechanism for an automotive vehicle, a pumping means adapted to effect periodic lubrication of the bearings of the vehicle, a cam shaft for said pumping means, a relatively rigid driving element for said cam shaft operable by the running gear of the vehicle and adapted to drive said cam shaft, a speedometer, a universally flexible shaft to actuate said speedometer, said cam shaft being adapted to drive said flexible shaft.

OSCAR U. ZERK.